United States Patent [19]
Lin et al.

[11] Patent Number: 5,863,364
[45] Date of Patent: *Jan. 26, 1999

[54] ULTRASONICALLY WELDED ELECTRICAL PLUG INCLUDING ILLUMINATED INDICATOR

[76] Inventors: Chien-Ting Lin, 2F, No. 27, Lane 193, Hang Sheng E. Rd., Panchio City, Taipei Hsien; Chao-Chuan Chien, 11F, No. 16, Lane 225, Hsin Tai Rd., Hsin Chuang City, Taipei Hsien, both of Taiwan

[*] Notice: The term of this patent shall not extend beyond the expiration date of Pat. No. 5,681,409.

[21] Appl. No.: 935,129

[22] Filed: Sep. 22, 1997

Related U.S. Application Data

[63] Continuation-in-part of Ser. No. 588,759, Jan. 19, 1996, Pat. No. 5,681,409.

[51] Int. Cl.$^6$ .................................................. B32B 31/16
[52] U.S. Cl. ................. 156/73.1; 156/308.4; 156/309.6; 264/445; 439/490; 439/694
[58] Field of Search ............................... 156/73.1, 308.2, 156/308.4, 309.6, 379, 580.1, 580.2; 264/442, 443, 445; 439/92, 484, 490, 694

[56] References Cited

U.S. PATENT DOCUMENTS

| | | | |
|---|---|---|---|
| D. 330,009 | 10/1992 | Dickie | D13/133 |
| 3,335,395 | 8/1967 | Smith | 339/107 |
| 3,760,338 | 9/1973 | Bruels | 339/196 |
| 3,900,360 | 8/1975 | Leatherman | 156/272 |
| 4,144,109 | 3/1979 | Waligorski | 156/73.1 |
| 4,284,317 | 8/1981 | Doyle | 339/103 R |
| 4,927,373 | 5/1990 | Dickie | 439/188 |
| 4,927,376 | 5/1990 | Dickie | 439/484 |
| 5,007,857 | 4/1991 | Wright | 439/490 |
| 5,053,926 | 10/1991 | Dickie | 361/424 |
| 5,057,036 | 10/1991 | Dickie | 439/484 |
| 5,139,141 | 8/1992 | Dickie | 206/329 |
| 5,182,032 | 1/1993 | Dickie et al. | 249/91 |
| 5,238,416 | 8/1993 | Dickie | 439/148 |
| 5,288,350 | 2/1994 | Kita | 156/73.1 |
| 5,320,560 | 6/1994 | Fradung | 439/490 |
| 5,397,408 | 3/1995 | Guzik et al. | 156/73.1 |
| 5,567,175 | 10/1996 | Warden et al. | 439/490 |
| 5,681,409 | 10/1997 | Lin et al. | 156/73.1 |

OTHER PUBLICATIONS

*A Guide to Ultrasonic Plastics Assembly*, Branson Instruments, Inc., Dec. 1974, pp. 11–17; 32–37.

*Primary Examiner*—James Sells
*Attorney, Agent, or Firm*—Gifford, Krass, Groh, Sprinkle, Patmore, Anderson & Citkowski

[57] ABSTRACT

A method of ultrasonic welding of plastic members to form a high strength interconnection between the members in the form of a low profile, illuminated electrical plug. High-frequency (ultrasonic) energy is transmitted by the ultrasonic welding apparatus to compatible plastic parts of the low profile electrical plug. At the intersection of the two parts, a combination of applied force and surface and/or intermolecular friction increases the temperature until the melting point of the thermoplastic is reached. Upon removal of the ultrasonic energy, a bond is produced between the plastic parts, effectively affixing them together in the desired fashion.

4 Claims, 1 Drawing Sheet

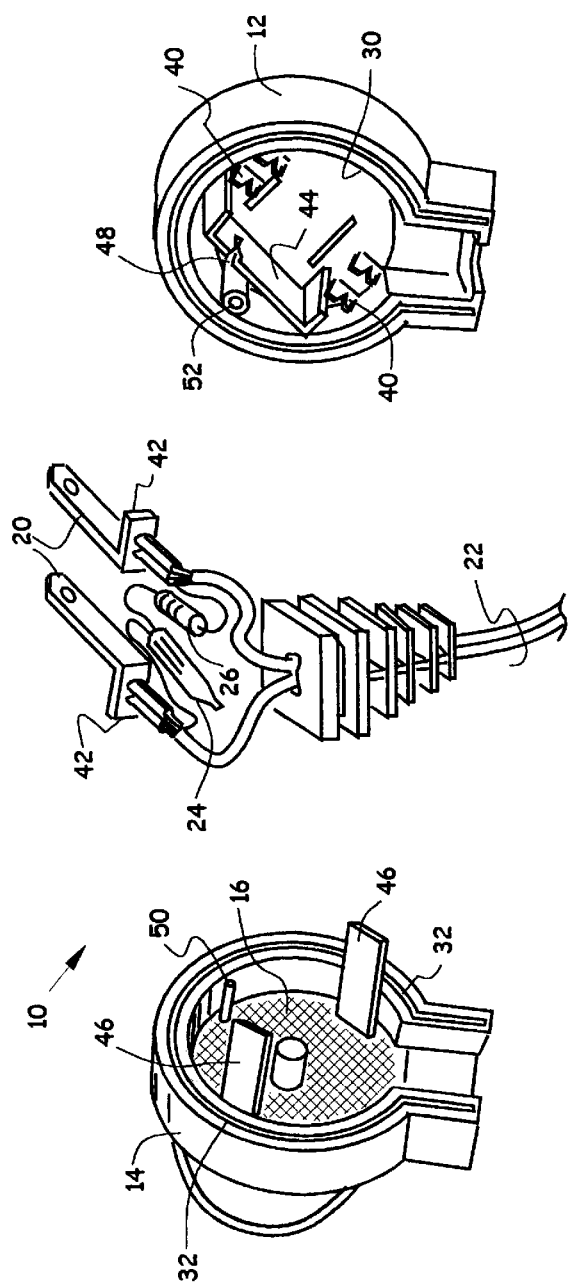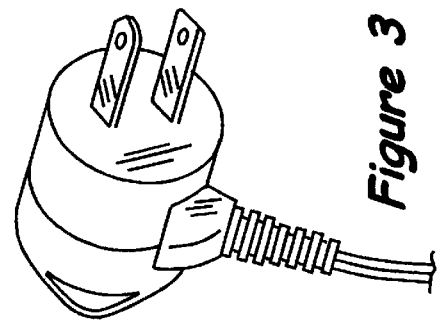
Figure 1
Figure 2A
Figure 2B
Figure 3

5,863,364

ULTRASONICALLY WELDED ELECTRICAL PLUG INCLUDING ILLUMINATED INDICATOR

REFERENCE TO RELATED APPLICATIONS

This application is a continuation-in-part of U.S. application Ser. No. 08/588,759, filed Jan. 19, 1996, now U.S. Pat. No. 5,681,409.

FIELD OF THE INVENTION

The present invention relates to a method of ultrasonically welding two plastic parts, in general, and more particularly, to a novel method of manufacturing a low-profile, illuminated electrical plugs through ultrasonic welding.

BACKGROUND OF THE INVENTION

Low profile electrical plugs are typically manufactured using an injection molding method. U.S. Pat. No. 5,182,032 to Dickie discloses an injection molding apparatus in which non-rigid or flexible components intended to be encapsulated within the interior of an injection molded product is provided.

Although injection molding is an effective method of manufacturing of low profile electrical plugs, it has been determined that ultrasonic welding the desired portions of the plug is a more accurate and less expensive procedure. In addition, injection molding requires that the same material be used to encapsulate the electrical components within the plug, making it difficult to produce hollow cavities and incorporate dissimilar materials to act as transparent or translucent windows. As such, if the plug is to incorporate an electrically illuminated lamp, as in the present invention, injection molding of the plug becomes problematic Ultrasonic assembly is well-known, and is suitable for most thermoplastic materials. In practice, high-frequency (ultrasonic) energy is transmitted by the ultrasonic welding apparatus to compatible plastic parts. At the intersection of the two parts, a combination of applied force and surface and/or intermolecular friction increases the temperature until the melting point of the thermoplastic is reached. Upon removal of the ultrasonic energy, a bond is produced between the plastic parts, effectively affixing them together in the desired fashion.

Typical systems used for ultrasonic welding contain a high-frequency power supply (20–40 kHz). Energy from the power supply is directed into a horn dimensioned to be resident at the applied frequency. Upon contact with the workpiece, the horn transmits the energy into it. The two parts to be welded are aligned in the proper fashion by a support constructed of aluminum or steel.

Accordingly, it is therefore a general object of the present invention to provide a method of manufacturing a low profile, illuminated electrical plug using an ultrasonic welding process that is less expensive and more accurate than conventional injection molding methods.

SUMMARY OF THE PRESENT INVENTION

The present invention is directed to the method of ultrasonic welding of plastic members to form a high strength interconnection between the members in the form of a low profile, illuminated electrical plug. More specifically, the low profile electrical plug is divided into two individual plastic portions, an upper half and a lower half which is at least partially translucent or transparent. Both the upper and lower halves are designed cooperatively such that they may be fastened together. A pair of electrically conductive blades are provided which make respective connections to electrical wiring, and across the blades, a lamp is wired which becomes illuminated as the blades are inserted into an electrical outlet.

In a preferred embodiment, a neon lamp and current limiting resistor are used as the source of illumination, though alternatives such as light-emitting diodes may also be utilized for this purpose. After insertion of the blades and lamp into the body of the plug, the upper half of the plug and the lower half of the plug are ultrasonically welded together. Raised male and female elements are provided within the body to hold the blades and lamp assembly in position after the ultrasonic welding process. A strain-relief cord is used to prevent the copper wire inside of the cord and plastic case from being damaged.

BRIEF DESCRIPTION OF THE DRAWINGS

Additional objects, advantages, and features of the present invention will become apparent from the following description and appended claims, taken in conjunction with the accompanying drawings in which:

FIG. 1 is an exploded perspective view of the present invention;

FIG. 2A is a cross sectional view showing the complementary nature of the upper and lower halves of the plug;

FIG. 2B is a view similar to FIG. 2A but showing the ultrasonic connection of the upper and lower halves of the plug; and FIG. 3 is a in perspective view of the electrical plug of the present invention shown ultrasonically welded together.

DETAILED DESCRIPTION OF THE PREFERRED EMBODIMENT

It should be understood that the following description of the preferred embodiment is merely exemplary in nature and is in no way intended to limit the invention or its applications or uses. For example, the following description of the method of ultrasonic welding, although specifically designed for use in manufacturing low profile electrical plugs, may be used for other purposes such as the construction of any device in which it is desirous to connect portions of a plastic assembly together. Modifications and variations of the present invention will readily occur to those skilled in the art.

Referring now to the drawings, in which corresponding parts are identified with the same reference numeral, and more particularly to FIG. 1, a low profile, illuminated electrical plug, designated by reference numeral 10, is shown manufactured by the method of ultrasonic welding that is one aspect of the present invention. The plug 10 includes an upper half 12 and a lower half 14. The upper half 12 and lower half 14 are designed in a complementary fashion such that they fit together. Although, in the preferred embodiment, the upper half 12 and lower half 14 are constructed of plastic, other materials may be used, with the limitation only that they be capable of being ultrasonically welded together. In addition, at least a portion of lower half 14 is at least translucent, enabling light from a lamp assembly described below to shine therethrough. In the preferred embodiment, the entire lower half 14 is constructed of a substantial transparent, colored plastic, including a lensed structure 16 to foster more consistent light transmission.

A pair of blades 20 are provided to make electrical connection between wires 22 and an electrical outlet (not shown). In addition, connected between lugs of the blades 20 is a lamp assembly including a lamp 24 and a current-limiting resistor 26. Preferably, the lamp 24 is of the neon type, though other alternative technologies may used, including a light-emitting diode.

Various raised male and female features are provided within upper half and lower half 14 to assist in the positioning of the internal components, to improve alignment between the two parts prior to the ultrasonic welding procedure. For example, upper half 12 preferably includes raised features 40 to receive and position side tabs 42 which extend transversely from the portion of the blades 20 to which the lamp assembly is electrically connected. In addition, a partial box-like structure 44 is used to receive plastic prongs 46 extending from the inner surface of the lower half 14. A serrated separation 48 in the longer section of the box-like structure 44 serves to receive the resistor 26 or one of the wires comprising the lamp assembly to stabilize its position prior to assembly of the two halves. A rod 50 of circular cross-section and receiving tube 52 act to further align the two halves prior to final assembly.

To facilitate the ultrasonic welding process, a groove 30 is positioned around the circumference of upper half 12 of the electrical plug 10. Likewise, a continuous bead 32 is positioned around the circumference of the lower half 14 of the electrical plug. It should be clear that the relative positions of the bead and groove may also be reversed. Referring to FIG. 2A, a cross section of the upper half 12 and lower half 14 are shown so as to depict the groove 30—bead 32 interface. It is at this interface that the ultrasonic welding will bind the upper half 12 and lower half 14 together.

To secure the upper half 12 and lower half 14 together, ultrasonic energy is applied to the groove 30—bead 32 interface. Conventionally, ultrasonic welding is carried out through the transformation of 60 Hz alternating current into a high frequency (20–40 kHz) signal, which in turn is converted to mechanical vibrations of similar ultrasonic frequency through a piezoelectric transducer. Such energy may come from a sonotrode or horn coupled to a suitable oscillator driven vibratory source. The weld horn is designed to mate with the upper half 12 while the lower half 14 may be constrained by a fixture which serves to prevent its deformation.

The ultrasonic welding process first begins with the application of a mechanical force to first cause the upper half 12 to touch the lower half 14, thus ensuring the intimate contact of the two plastic parts. Once this force is applied, the introduction of ultrasonic energy begins. The ultrasonic energy causes the intermolecular vibrations, and thus frictional heat between the upper half 12 and lower half 14. Through proper groove 30—bead 32 design, the intermolecular friction can be maximized locally, thereby selectively melting portions of the upper half 12 and lower half 14 together at the groove 30—bead 32 interface.

Referring now to FIG. 2B, a cross section of the upper half 12 and lower half 14 are shown after the ultrasonic welding process. As is demonstrated, the groove 30—bead 32 interface is effectively welded together.

FIG. 3 shows the flat, illuminated electrical plug 10 manufactured according to the process of ultrasonic welding herein described. As will readily become apparent, although the preferred embodiment of the present invention was designed with a groove 30—bead 32 interface upon which to facilitate welding of the upper half 12 and lower half 14 together, the plastic parts may be designed in a multitude of ways to permit welding forces in other places.

As will be apparent to one of ordinary skill in the art, the preferred embodiment of the invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit or scope of the invention as further defined in the following claims.

Having thus described my invention, I claim:

1. A method of ultrasonically welding plastic parts to form a low-profile, illuminated electrical plug, comprising the steps of:

providing two elongated, electrically conductive blades and an electrically illuminated lamp, each of said prongs having a first end to be retained within said plug for making connection to said lamp and to respective wiring, each prong further including a second end to protrude externally of said plug for insertion into an electrical outlet;

providing first and second plastic parts that define said electrical plug, said first plastic part being at least translucent, enabling light produced by said electrically illuminated lamp to project therethrough when said second ends of said prongs are inserted into said electrical outlet, and said second plastic part including a pair of slotted apertures through which said second ends of said prongs protrude;

one of said first and said second plastic parts further including a peripheral bead which is substantially continuous except for a portion enabling said wiring to emerge from said plug, the other of said first and said second plastic parts including a peripheral groove to receive said peripheral bead;

aligning said first and second plastic parts together such that said bead interacts with said groove, with said first ends of said prongs and said electrically illuminated lamp being retained therebetween, and with said second ends of said prongs protruding through said slotted apertures, and with said wiring emerging from said non-beaded and non-grooved portion;

applying a force to said first and said second parts in excess of that required to cause the groove and bead to contact; and welding said first plastic part to said second plastic part through the application of ultrasonic energy to the interface between the bead and groove.

2. The method of claim 1, wherein the step of ultrasonically welding said first plastic part to said second plastic part further comprises the steps of:

providing a 60 Hz alternating current source;

transforming the 60 Hz current source into a high frequency signal;

inputting the high frequency signal into a piezoelectric transducer;

transforming said high frequency signal into an oscillatory driven vibratory source; and directing the vibratory source to the plastic parts.

3. An illuminated electrical plug, comprising:

an electrically illuminated lamp;

two elongated, electrically conductive blades, each having first and second ends, the first ends being retained within said plug for making connection to said lamp and to respective wiring, the second ends protruding externally of said plug for insertion into an electrical outlet;

first and second plastic parts that define said electrical plug, said first plastic part being at least translucent, enabling light produced by said electrically illuminated lamp to project therethrough when said second ends of said blades are inserted into said electrical outlet, and said second plastic part including a pair of slotted apertures through which said second ends of said prongs protrude;

one of said first and said second plastic parts further including a peripheral bead which is substantially continuous except for a portion enabling said wiring to emerge from said plug, the other of said first and said second plastic parts including a peripheral groove to receive said peripheral bead, said bead and said groove being provided for the purpose of ultrasonically welding together said first and said second plastic parts.

4. The illuminated electrical plug of claim 3, wherein said electrically illuminated lamp further includes a neon bulb in series with a current-limiting resistor.

* * * * *